US012401158B2

(12) United States Patent
Yoshioka et al.

(10) Patent No.: US 12,401,158 B2
(45) Date of Patent: Aug. 26, 2025

(54) CONNECTOR SET MATING METHOD FOR CONNECTING TWO PLUG CONNECTORS TO TWO SOCKET CONNECTORS AND A CONNECTOR SET USING THE SAME

(71) Applicants: TOYOTA JIDOSHA KABUSHIKI KAISHA, Toyota (JP); SUMITOMO WIRING SYSTEMS, LTD., Yokkaichi (JP)

(72) Inventors: Kentaro Yoshioka, Toyota (JP); Makoto Yoshikawa, Nisshin (JP); Ryosuke Shibata, Toyota (JP); Kenta Itayama, Hekinan (JP); Shifumi Sadakata, Yokkaichi (JP)

(73) Assignees: TOYOTA JIDOSHA KABUSHIKI KAISHA, Toyota (JP); SUMITOMO WIRING SYSTEMS, LTD., Yokkaichi (JP)

( * ) Notice: Subject to any disclaimer, the term of this patent is extended or adjusted under 35 U.S.C. 154(b) by 385 days.

(21) Appl. No.: 17/655,067

(22) Filed: Mar. 16, 2022

(65) Prior Publication Data

US 2022/0302648 A1 Sep. 22, 2022

(30) Foreign Application Priority Data

Mar. 19, 2021 (JP) ................................ 2021-046094

(51) Int. Cl.
*H01R 13/639* (2006.01)
*H01R 13/502* (2006.01)
(Continued)

(52) U.S. Cl.
CPC ......... *H01R 13/639* (2013.01); *H01R 13/502* (2013.01); *H01R 13/506* (2013.01);
(Continued)

(58) Field of Classification Search
CPC .. H01R 13/639; H01R 13/502; H01R 13/506; H01R 13/629; H01R 13/64; H01R 43/26;
(Continued)

(56) References Cited

U.S. PATENT DOCUMENTS 4,998,884 A * 3/1991 Ishikawa .............. H01R 13/629 439/372
6,176,745 B1 * 1/2001 Furutani .............. H01R 13/506 439/701

(Continued)

FOREIGN PATENT DOCUMENTS

JP 1-113976 U 7/1989
JP 7-42016 U 7/1995

(Continued)

*Primary Examiner* — Justin M Kratt

(74) *Attorney, Agent, or Firm* — Oblon, McClelland, Maier & Neustadt, L.L.P.

(57) ABSTRACT

Each of two plug connectors includes a main body configured to retain a plurality of electric wires and a pair of push members protruding from both sides of the main body along a first direction. In connector mating operation, the two plug connectors are respectively inserted into associated receptacle connectors in a state where the two plug connectors are mechanically coupled or bound to a relative positional relationship by a jig in a position where the pair of push members in one of the two plug connectors are displaced from the pair of push members in the other of the two plug connectors along a second direction orthogonal to the first direction.

5 Claims, 9 Drawing Sheets

(51) Int. Cl.

| | |
|---|---|
| ***H01R 13/506*** | (2006.01) |
| ***H01R 13/629*** | (2006.01) |
| ***H01R 13/64*** | (2006.01) |
| ***H01R 43/26*** | (2006.01) |
| *H01R 13/514* | (2006.01) |
| *H01R 13/516* | (2006.01) |
| *H01R 13/518* | (2006.01) |
| *H01R 13/62* | (2006.01) |
| *H01R 13/627* | (2006.01) |
| *H01R 24/00* | (2011.01) |
| *H01R 43/00* | (2006.01) |

(52) U.S. Cl.

CPC ........... *H01R 13/629* (2013.01); *H01R 13/64* (2013.01); *H01R 43/26* (2013.01); *H01R 13/514* (2013.01); *H01R 13/516* (2013.01); *H01R 13/518* (2013.01); *H01R 13/62* (2013.01); *H01R 13/627* (2013.01); *H01R 13/6271* (2013.01); *H01R 13/6275* (2013.01); *H01R 24/005* (2013.01); *H01R 43/00* (2013.01); *H01R 2201/26* (2013.01)

(58) Field of Classification Search

CPC .. H01R 13/514; H01R 13/516; H01R 13/518; H01R 13/62; H01R 13/627; H01R 13/6271; H01R 13/6275; H01R 24/005; H01R 43/00; H01R 2201/26

See application file for complete search history.

(56) References Cited

U.S. PATENT DOCUMENTS

| | | | | |
|---|---|---|---|---|
| 2009/0042445 | A1 | 2/2009 | Ichio et al. | |
| 2017/0346230 | A1* | 11/2017 | Imai ..................... | H01R 13/639 |
| 2019/0103705 | A1 | 4/2019 | Amemiya et al. | |
| 2020/0014146 | A1 | 1/2020 | Aoshima et al. | |

FOREIGN PATENT DOCUMENTS

| | | | |
|---|---|---|---|
| JP | 2009-43642 | A | 2/2009 |
| JP | 2016-103393 | A | 6/2016 |
| JP | 2016-122563 | A | 7/2016 |
| JP | 2019-67744 | A | 4/2019 |
| JP | 2019-87408 | A | 6/2019 |
| JP | 2020-9614 | A | 1/2020 |

* cited by examiner

CONNECTOR SET MATING METHOD FOR CONNECTING TWO PLUG CONNECTORS TO TWO SOCKET CONNECTORS AND A CONNECTOR SET USING THE SAME

CROSS REFERENCE TO RELATED APPLICATION

This application claims priority to Japanese Patent Application No. 2021-046094 filed on Mar. 19, 2021, which is incorporated herein by reference in its entirety including the specification, claims, drawings, and abstract.

TECHNICAL FIELD

The present specification discloses a connector mating method for respectively inserting and mating a first plug connector into a first receptacle connector and a second plug connector into a second receptable connector, and also discloses a connector set comprising the first plug connector and the second plug connector.

BACKGROUND

Typically, connector devices include a receptacle connector having a recess for connection and a plug connector having a protrusion to be inserted into the recess of the receptacle connector. Some plug connectors retain a plurality of electric wires aligned along a predetermined arrangement direction.

For example, JP 2019-87408 A (Patent Document 1) discloses a plug connector (which is referred to as a “first connector” in Patent Document 1) equipped with a housing for retaining a plurality of electric wires which are aligned along a predetermined arrangement direction. It has been desired that the size of such plug connectors be further minimized. In particular, when a plug connector is utilized in a situation where a great number of electronic devices are arranged in a limited space, as in the case of a vehicle, it is desirable to further minimize the plug connector.

CITATION LIST

Patent Literature

Patent Document 1: JP 2019-87408 A

Under the circumstances, attempts to decrease dimensions of plug connectors have been made conventionally. For example, in the plug connector of Patent Document 1, its dimensions along a thickness direction orthogonal to the arrangement direction are reduced as much as possible. In the above-described configuration, however, a region which is pushed by fingers in order to mate the plug connector with the receptacle connector is limited to only two points located on both sides of a plurality of electric wires in the arrangement direction. When only the two points are pushed as described above, the plug connector is easily inclined about a line passing through the two points. As a result, it has been difficult to appropriately insert the plug connector into the receptable connector.

In other words, minimization of the plug connector conventionally results in poor workability of operation to insert the plug connector into the receptacle connector.

In view of the circumstances, the present specification discloses a connector mating method and a connector set with which workability in operation of inserting a plug connector into a receptacle connector can be improved while maintaining the plug connector in a thin shape.

SUMMARY

A connector mating method disclosed in this specification is a method for inserting a first plug connector into a first receptacle connecter and a second plug connector into a second receptacle connector to mate the connectors, in which each of the first plug connector and the second plug connector includes a main body configured to retain a plurality of electric wires and a pair of push members protruding from both sides of the main body along a first direction, and in which the first plug connector and the second plug connector are mechanically coupled to each other or bound by a jig to a relative positional relationship therebetween in a position where the pair of push members in the first plug connector are displaced from the pair of push members in the second plug connector along a second direction orthogonal to the first direction, and are inserted into the first plug connector and the second plug connector while being mechanically coupled to each other or being bound to the relative positional relationship by the jig.

In the above-described configuration, a total of four push members disposed on the first and second plug connectors are pushed while maintaining a positionally restricted relationship therebetween. This makes the first and second plug connectors less prone to inclination. As a result, workability in operation to insert the plug connector into the receptacle connector can be improved while maintaining a small size of each of the plug connectors.

In this case, a plurality of wire connection holes through which the electric wires are inserted may be arranged in a line along the first direction.

When the plurality of wire connection holes are arranged in the line along the same direction as an arrangement direction in which the pair of push members are arranged (i.e., the first direction), the plug connector can be configured to have smaller dimensions in the second direction, and accordingly have a thin outline.

In an aspect of this disclosure, the first plug connector and the second plug connector may be mechanically coupled to each other or bound by the jig to the relative positional relationship in a position where the first plug connector and the second plug connector are adjacent to each other in the second direction.

When configured as described above, the first and second plug connectors mated with the first and second receptacle connectors can be made compact in size.

In an aspect of the present disclosure, each of the first plug connector and the second plug connector may further include a guide rib extending along an insertion direction of the plug connectors, the guide rib being designed to be received in a guide groove defined in an associated one of the receptacle connectors. Further, a relative position between the guide rib and the main body in the first plug connector may be varied from a relative position between the guide rib and the main body in the second plug connector, and when one of the plug connectors tries to enter an unassociated one of the receptacle connectors, the guide rib interferes with a part of the unassociated one of the receptacle connectors to thereby block further entry of the plug connector.

The above-described configuration can reliably prevent an insertion error where the plug connector is inserted into an unassociated one of the receptacle connectors.

A connector set disclosed herein includes a first plug connector configured to be inserted into a first receptacle connector and a second plug connector configured to be inserted into a second receptacle connector, in which each of the first plug connector and the second plug connector has a main body configured to retain a plurality of electric wires and a pair of push members protruding along a first direction from both sides of the main body. Further, in the connector set, the first plug connector is mechanically connectable to the second plug connector in a position where the pair of push members in the first plug connector are displaced from the pair of push members in the second plug connector along a second direction orthogonal to the first direction.

When configured as described above, a total of four push members disposed on the first and second plug connectors are pushed while maintaining the positionally restricted relationship therebetween. This makes the first and second plug connectors less prone to inclination about a line. As a result, workability in operation to insert the plug connectors into the receptacle connectors can be improved while maintaining a small size of each of the plug connectors.

Another connector set disclosed herein includes a first plug connector configured to be inserted into a first receptacle connector, a second plug connector configured to be inserted into a second receptacle connector, and a jig, in which each of the first plug connector and the second plug connector includes a main body configured to retain a plurality of electric wires and a pair of push members protruding along a first direction from both sides of the main body. Further, in the other connector set, the jig includes a binding member which is configured to house a part of each of the first and second plug connectors in such a manner that the first and second plug connectors are bound to a relative positional relationship therebetween in a position where the pair of push members in the first plug connector are displaced from the pair of push members in the second plug connector along a second direction orthogonal to the first direction.

When configured as described above, a total of four push members disposed on the first and second plug connectors are pushed while maintaining the positionally restrained relationship therebetween. This makes the first and second plug connectors less prone to inclination about a line. In this way, workability in operation to insert the plug connectors into the receptacle connectors can be improved while maintaining a small size of each of the plug connectors.

A technique disclosed herein can ensure that the workability in operation to insert the plug connectors into the receptacle connectors is further improved while maintaining the small size of each of the plug connectors.

BRIEF DESCRIPTION OF DRAWINGS

Embodiments of the present disclosure will be described based on the following figures, wherein.

DESCRIPTION OF EMBODIMENTS

Figure 1:
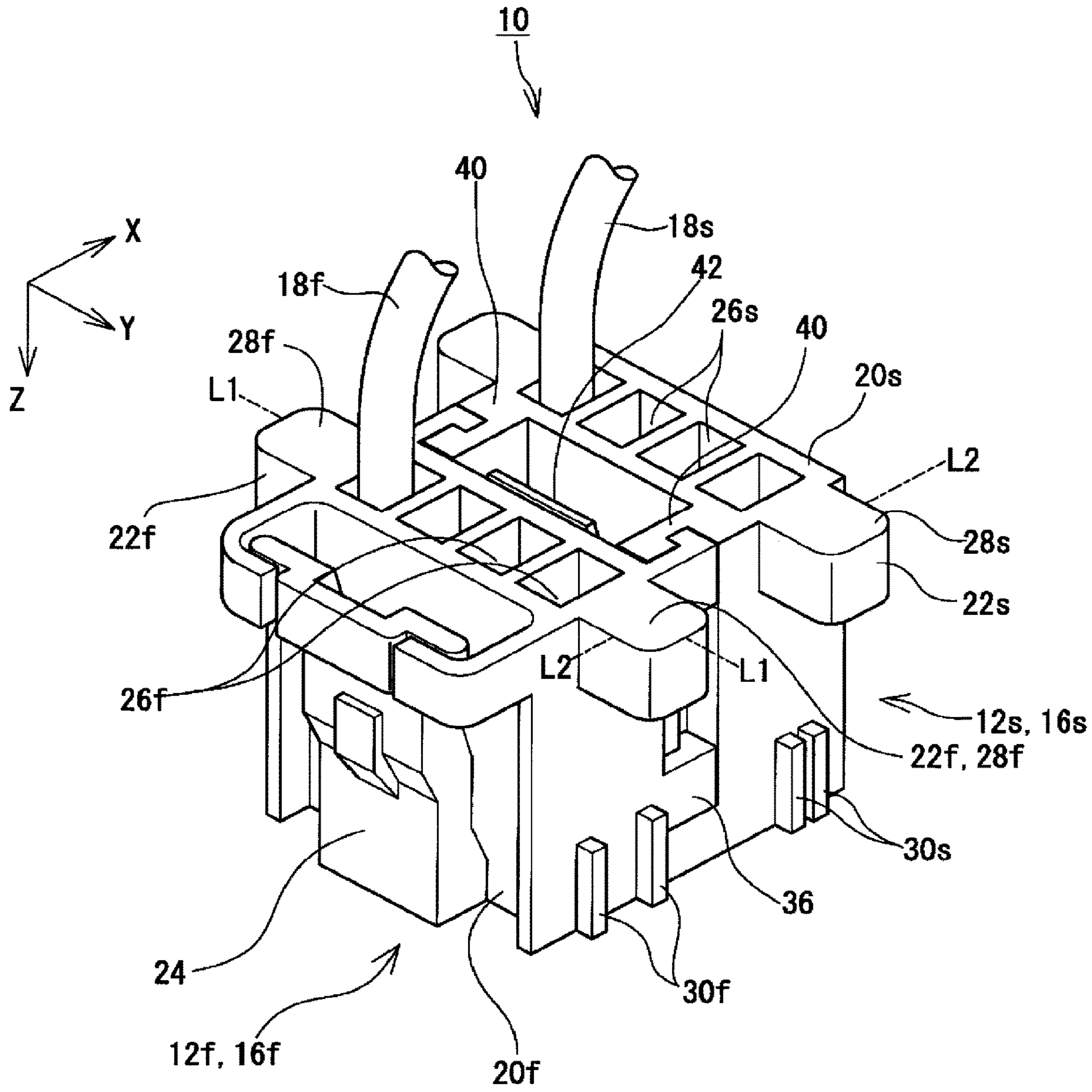
FIG. 1 is a perspective view of a connector set.
Figure 2:
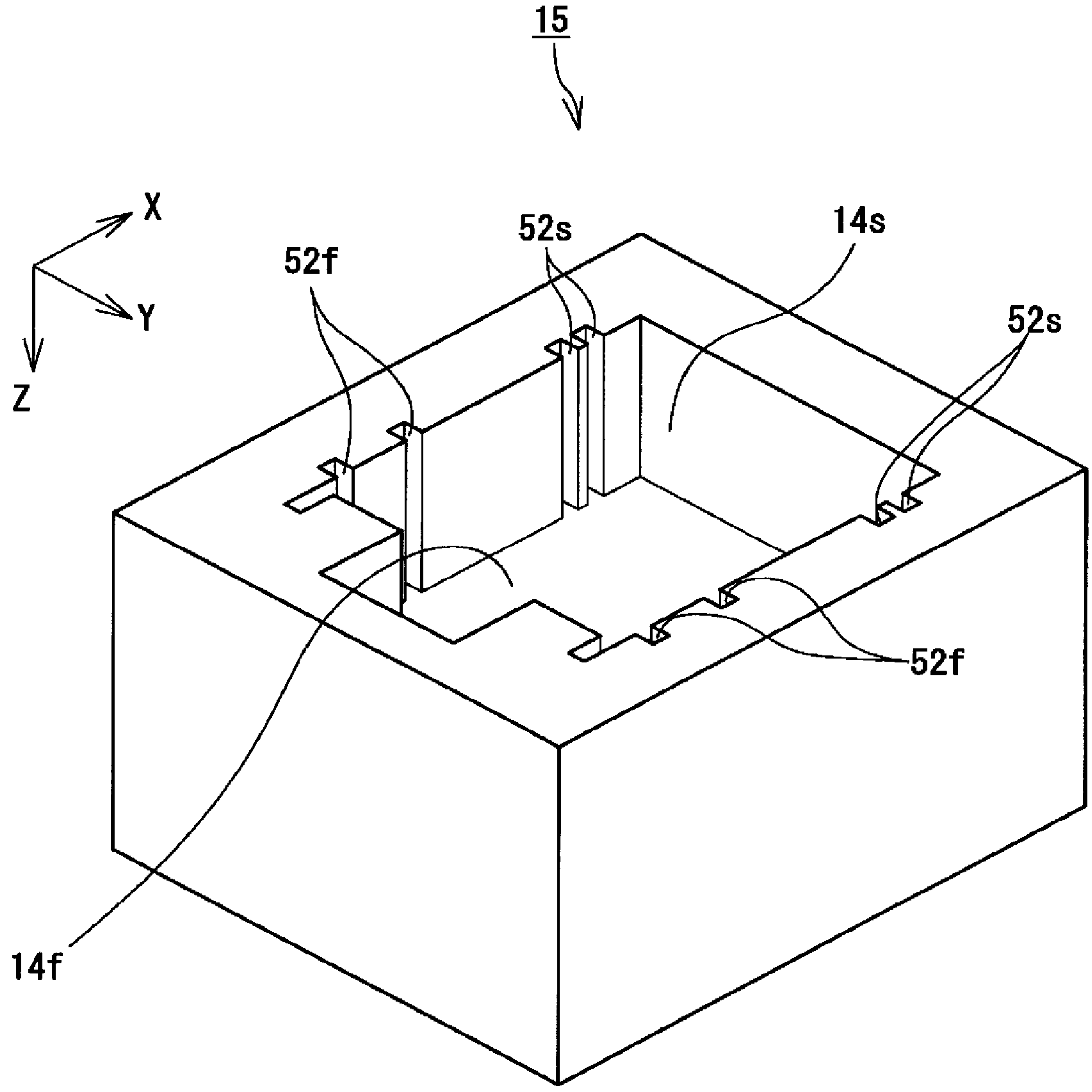
FIG. 2 is a perspective view of a terminal base.
Figure 3:
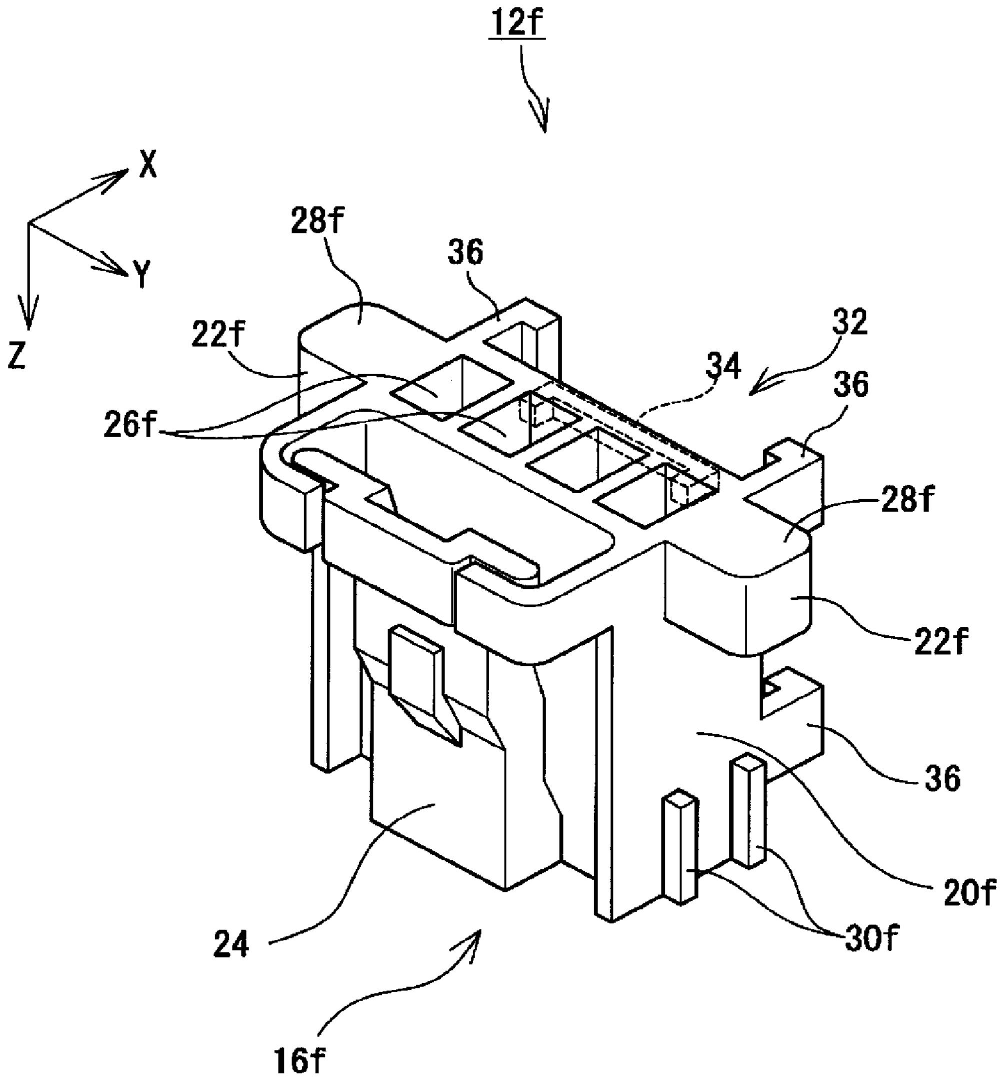
FIG. 3 is a perspective view of a first plug connector.
Figure 4:
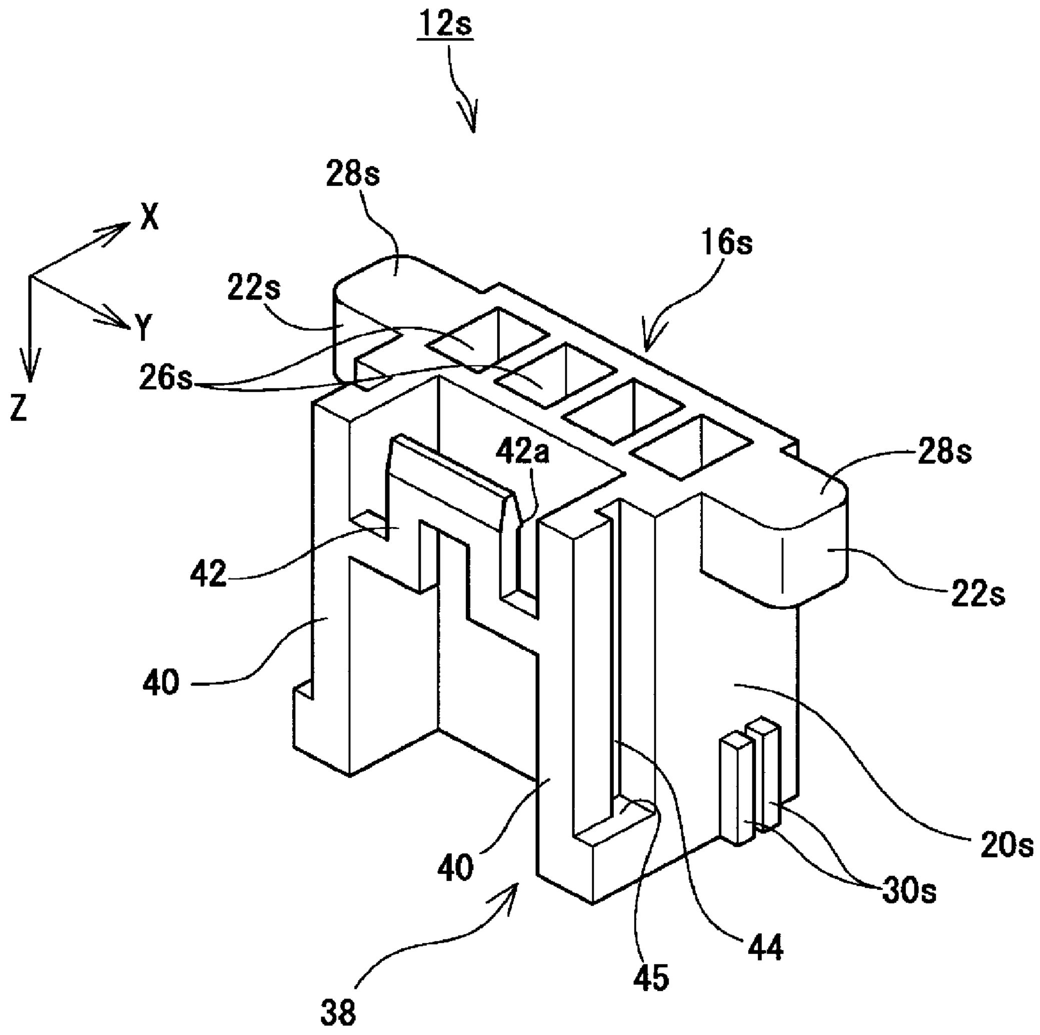
FIG. 4 is a perspective view of a second plug connector.

Hereinafter, a connector set 10 incorporating two plug connectors composed of a first plug connector **12*f* and a second plug connector 12*s*, and a connector mating method using the connector set 10 will be described with reference to the drawings. FIG. 1 shows a perspective view of the connector set 10, and FIG. 2 shows a perspective view of a terminal base 15 which has two receptacle connectors 14*f* and 14*s* to receive the connector set 10. FIGS. 3 and 4 respectively show perspective views of the first plug connector 12*f* and the second plug connector 12*s*. In the following description, a direction in which the plug connectors 12*f* and 12*s* are inserted into the receptacle connectors 14*f* and 14*s* is referred to as an "insertion direction", a direction in which a pair of push members 22**, which will be described below, are arranged is referred to as a "first direction", and a direction orthogonal to both the insertion direction and the first direction is referred to as a "second direction". Further, in the following description, a posterior part of the insertion direction is considered a "downside", and an anterior part of the insertion direction is considered an "upside". However, the terms "downside" and "upside" are irrelevant to gravitational downside and upside. In the drawings, the "first direction", the "second direction", and the "insertion direction" are described as "Y", "X", and "Z", respectively.

The connector set 10 includes two plug connectors consisting of the first plug connector **12*f* and the second plug connector 12*s*. The terminal base 15 has a first receptacle connector 14*f* in which the first plug connector 12 is inserted and a second receptacle connector 14*s* in which the second plug connector 12*s* is inserted. In this example, the two receptacle connectors 14*f* and 14*s* are merged with each other to form one large recess. Each of the plug connectors 12*f* and 12*s* is inserted into an associated one of the receptacle connectors 14*f* and 14*s*** and fitted therein to electrically connect on-board electronic devices installed in a vehicle to other on-board electronic devices.

More specifically, the first plug connector **12*f* is connected to a first temperature sensor (not illustrated) via four electric wires 18*f* (in FIG. 1, only one of the electric wires 18*f* is illustrated, and is omitted in FIG. 3). The second plug connector 12*s* is connected to a second temperature sensor (not illustrated) via four electric wires 18*s* (in FIG. 1, only one of the electric wires 18*s* is illustrated, and is omitted in FIG. 3). The first temperature sensor is installed in a not-illustrated first rotating electric machine which is mounted on the vehicle to detect the temperature of the first rotating electric machine. Similarly, the second temperature sensor is incorporated in a not-illustrated second rotating electric machine which is mounted on the vehicle to detect the temperature of the second rotating electric machine. When the plug connectors 12*f* and 12*s* are inserted into the receptacle connectors 14*f* and 14*s***, the first and second temperature sensors are electrically connected to other electronic devices and become able to transmit and receive electric power and electric signals.

The first plug connector **12*f* and the second plug connector 12*s*, which are completely separated independent parts, are mechanically coupled and merged into one unit as shown in FIG. 1 when the plug connectors 12*f* and 12*s* are inserted into the corresponding receptacle connectors 14, respectively. Configurations of the first plug connector 12***f* and the second plug connector 12*s* are explained in detail below.

The first plug connector 12*f* has a resin housing 16*f* and an electric mechanism (not illustrated) arranged within the resin housing 16*f*. The electric mechanism includes components, such as an input-side contact to be brought into contact with the electric wire 18*f*, an output-side contact contactable with a contact of the first receptacle connector 14*f*, and a connection line for electrically connecting the input-side contact and the output-side contact. As the components can be implemented by conventionally known techniques, details of the components are not explained herein.

The housing 16*f* is roughly divided into five portions consisting of a main body 20*f*, a push member 22*f*, a retainer lug 24, a guide rib 30, and a coupler member 32. The main body 20*f* is an approximately rectangular member configured to retain the electric mechanism and a plurality of electric wires 18*f*. An upper end surface of the main body 20*f* located on an upper side in the insertion direction (Z direction) is provided with four wire connection holes 26*f* which are arranged in a row along the first direction (Y direction). The electric wires 18*f* are respectively inserted into the wire connection hole 26*f*. The electric wires 18*f* inserted into the wire connection holes 26*f* are secured in a state of being in contact with the input-side contact. Dimensions of the main body 20*f* in the second direction (X direction) and the first direction are defined as small as possible within a range capable of maintaining appropriate strength. As a result, the upper end surface of the main body 20*f* is in most areas occupied by the wire connection holes 26*f*, leaving almost no area for fingers to push the main body 20*f* on the upper end surface.

The retainer lug 24 is fixed to an end surface of the main body 20 that is located at one of second direction ends of the main body 20. The retainer lug 24 is a cantilever arm type member which is fixed only at its lower portion to the main body 20*f*, and is configured to be swingable through flexure in the second direction. When the first plug connector 12*f* is inserted into the first receptacle connector 14*f*, a part of the retainer lug 24 is engaged with a part of the first receptacle connector 14*f*. This can prevent unintended removal of the first plug connector 12*f* from the first receptacle connector 14*f*. The first plug connector 12*f* can be withdrawn and removed from the first receptacle connector 14*f* by pulling the first plug connector 12*f* upward in a state where the retainer lug 24 is swung toward the main body 20*f*.

A pair of push members 22*f* are protruded outward along the first direction from side surfaces of the main body 20*f* located at both first direction ends thereof. Upper end surfaces of the push members 22*f* function as pushing surfaces 28*f* which are pushed by fingers in order to insert the first plug connector 12*f* into the first receptacle connector 14*f*. The pushing surfaces 28*f* are flush with the upper end surface of the main body 20*f*, i.e. the surface in which the wire connection holes 26*f* are defined.

The coupler member 32 is designed to be engaged with a part of the second plug connector 12*s* for coupling the first plug connector 12*f* to the second plug connector 12*s*. The coupler member 32 includes a coupling loop 34 (see FIG. 3) and a plurality of slide claws 36. It should be noted that, in FIG. 3, the coupling loop 34 is located at an invisible position, and is therefore indicated by a broken line in the drawing.

The coupling loop 34 is outwardly protruded along the second direction from an end surface of the main body 20*f* that is located at the other of the send direction ends of the main body 20*f* (i.e., the end surface opposite to the retainer lug 24), and is configured to define a vertical through hole between the end surface of the main body 20*f* and the coupling loop 34 itself. A coupling lug 42 in the second plug connector 12*s*, which will be described below, enters the hole to engage with the coupling loop 34.

The slide claws 36 are outwardly protruded along the second direction, at both first direction ends, from the end surface of the main body 20*f* that is located at the other of the second direction ends of the main body 20*f*. A total of four slide claws 36 are arranged in a two-by-two matrix in which the slide claws 36 are spaced from each other in both the first direction and the vertical direction. Each of the slide claws 36 is formed in an approximately L-letter shape with its tip end being bent inward in the first direction. When such tip ends of the slide claws 36 are fitted in below-described slide rails 44 of the second plug connector 12*s*, the first plug connector 12*f* is allowed to move relative to the second plug connector 12*s* along the insertion direction, while being restricted so as not to move along the first direction or the second direction.

Guide ribs 30*f* extending along the insertion direction are formed on both end surfaces of the main body 20*f* that are located at first direction ends of the main body 20*f*. In this example, two guide ribs 30*f* are disposed for each of the end surfaces, and a total of four guide ribs 30 are provided to the entire first plug connector 12*f*. The first receptacle connector 14*f* has guide grooves 52*f* which are configured to receive the guide ribs 30*f*. When the guide ribs 30*f* are inserted into the guide grooves 52*f*, movement of the first plug connector 12*f* is guided in the vertical direction (i.e., the insertion direction).

Next a configuration of the second plug connector 12*s* will be described. The second plug connector 12*s* includes, as in the case of the first plug connector 12*f*, a resin housing 16*s* and a not-illustrated electric mechanism installed within the housing 16*s*. The housing 16*f* includes a main body 20*s*, push members 22*s*, a coupling member 38, and guide ribs 30*s*. The main body 20*s* and the push members 22*s* are almost identical in structure to the main body 20*f* and the push members 22*f* of the first plug connector 12*f*, and explanation related to these components is not repeated.

The coupling member 38 includes a pair of rail members 40 and the coupling lug 42. The rail members 40 are formed in a flat plate shape extending outward in the second direction from an end surface of the main body 20*s* that is located on one of second direction ends of the main body 20*s*. The pair of rail members 40 are spaced from each other in the first direction. A slide rail 44 extending along the vertical direction is formed on an outer end surface facing outward in the first direction for each of the rail members 40. The slide rail 44 extends, as shown in FIG. 4, penetrating through an upper end surface of the rail member 40. Therefore, the tip end of the slide claw 36 in the first plug connector 12*f* can be inserted from above the second plug connector 12*s* into the slide rail 44. On the other hand, the slide rail 44 does not reach a lower end of the rail member 40, and a stopper surface 45, which is a flat plane facing upward, is defined in the rail member 40 at a height that matches a lower end of the slide rail 44. The stopper surface 45 blocks the slide claw 36 to prevent the first plug connector 12*f* from sliding further below the stopper surface 45.

The coupling lug 42 is disposed between the pair of rail members 40. The coupling lug 42 is a lug member protruding upward. The coupling lug 42 has a hitching portion 42*a* protruding along the second direction in the vicinity of a tip end of the coupling lug 42, and an upper area of the coupling lug 42 located above the hitching portion 42*a* is formed in a tapered shape whose dimension in the second direction is gradually decreased toward the top of the coupling lug 42.

Similarly to the guide ribs 30*f*, the guide ribs 30*s* extending along the insertion direction are formed on both end surfaces of the main body 20*s* that are located on first direction ends of the main body 20*s*. Guide grooves 52*s* for receiving the guide ribs 30*s* are defined in the second receptacle connector 14*s*.

When the first plug connector 12*f* and the second plug connector 12*s* are inserted into the first receptacle connector 14*f* and the second receptacle connector 14*s*, the first plug connector 12*f* and the second plug connector 12*s* are coupled and merged into one unit. Specifically, in operation to couple the plug connectors 12*f* and 12*s*, the slide claws 35 are fitted into the slide rails 44 from above the side rails 44, and the first plug connector 12*f* is slid downward on the second plug connector 12*s*. The downward sliding of the first plug connector 12*f* is guided by the slide rails 44. The coupling lug 42 enters the hole in the coupling loop 34 at some point during the sliding of the first plug connector 12*f*.

Then, the first plug connector 12*f* is slid further downward until the slide claws 36 located on a lower part make contact with the stopper surface 45. At this time, the hitching portion 42*a* passes through the coupling loop 34 to surmount the coupling loop 34. The contact of the lower slide claws 36 with the stopper surface 45 hampers further downward movement of the first plug connector 12*f*. Meanwhile, when the hitching portion 42*a* has surmounted the coupling loop 34, the hitching portion 42*a* and the coupling loop 34 are engaged with each other, to thereby hamper upward movement of the first plug connector 12*f*. In other words, when the lower slide claws 34 are brought into contact with the stopper surface 45, the first plug connector 12*f* becomes unable to move relative to the second plug connector 12*s*, and the first and second plug connectors 12*f* and 12*s* are mechanically coupled to each other accordingly.

Dimensions of each section in the coupler member 32 and the coupling member 34 are defined in such a manner that the two plug connectors 12*f* and 12*s* are aligned at the same height when coupling between the plug connectors 12*f* and 12*s* is complete. Therefore, in this example, a total of four pushing surfaces 28*f*, 28*s* are located on the same plane when the two plug connectors 12*f* and 12*s* are completely coupled to each other. In addition, when the coupling is complete, the pair of pushing surfaces 28*f* in the first plug connector 12*f* are displaced in the second direction from the pair of pushing surfaces 28*s* in the second plug connector 12*s*.

After coupling the two plug connectors 12*f* and 12*s*, an operator inserts the two coupled plug connectors 12*f* and 12*s* into the hole in the receptacle connectors 12*f* and 14*s*. In this inserting operation, the operator pushes the four pushing surfaces 28*f* and 28*s* from thereabove with their hands. Then, mating of the connectors is finally complete when the plug connectors 12*f* and 12*s* are inserted into the receptacle connectors 14*f* and 14*s* to a position where the retainer lug 24 is engaged with a part of the first receptacle connector 14*f*.

As can be clearly understood from the above description, the two plug connectors 12*f* and 12*s* are mechanically coupled to each other in order to insert the two plug connectors 12*f* and 12*s* into the receptacle connectors 14*f* and 14*s* in this example. The reason for mechanically coupling the two plug connectors 12*f* and 12*s* is described below.

As described above, the first plug connector 12*f* in this example is connected to the first temperature sensor, and the second plug connector 12*s* is connected to the second temperature sensor. Further, the first temperature sensor is incorporated in the first rotating electric machine, while the second temperature sensor is incorporated in the second rotating electric machine. Both the first rotating electric machine and the second rotating electric machine are mounted on the vehicle. Here, in addition to the rotating electric machines, a variety of electronic devices are mounted on the vehicle, while a space available for mounting such components within the vehicle is limited. For this reason, it is desired that on-board components including the plug connectors 12*f* and 12*s* be minimized to the greatest possible extent.

To satisfy such a desire, the main bodies 20*f* and 20*s* of the plug connectors 12*f* and 12*s* are reduced in size to a maximum possible extent at which the strength of the main bodies 20*f* and 20*s* can be properly maintained. As a result, the upper end surfaces of the main bodies 20*f* and 20*s* are mostly occupied by the wire connection holes 26, leaving almost no areas available for pushing by fingers. Therefore, in this example, the push members 22 are provided at both first direction ends of the main bodies 20*f* and 20*s* to secure the pushing surfaces 28*f* and 28*s* which can be pushed by the fingers.

Here, it is assumed that the first plug connector 12*f* is solely inserted into the first receptacle connector 14*f* without being mechanically coupled to the first plug connector 12*s*. In this case, the operator pushes the two pushing surfaces 28*f* located on both sides of the main body 20*f* by hand. In other words, only two points on a line along the first direction are pushed by the operator. When pushed in this way, the first plug connector 12*f* is apt to sway about the line passing through the two points. As a result, there is a risk that the first plug connector 12*f* may be inserted in a state of being inclined relative to the first receptacle connector 14*f*. When the first plug connector 12*f* is inclined, the guide ribs 30*f* butt against the guide grooves 52*f*, which hinders further insertion of the first plug connector 12*f* Therefore, it has been necessary for the operator to slightly adjust the first plug connector 12*f* to correct for the position every time the first plug connector 12*f* is inclined. That is, in a case where the first plug connector 12*f* is solely inserted into the first receptacle connector 14*f*, because the operator is repeatedly required to adjust the position of the first plug connector 12*f* which is apt to be inclined, connector mating work can often be time consuming.

With this in mind, in connector mating operation according to this example, the first plug connector 12*f* and the second plug connector 12*s* are mechanically coupled to be merged into one unit. As a result, the merged plug connectors 12*f* and 12*s* are equipped with the four pushing surfaces 28*f* and 28*s* as a whole. The four pushing surfaces 28*f* and 28*s* are spaced from each other in both the first direction and the second direction, and are not aligned in a row. In an action of pushing the four pushing points, inclination about a line that passes through two pushing points among the four pushing points can be prevented by a force applied to the other two pushing points. For example, in FIG. 1, if the first plug connector 12*f* sways around a line L1 passing through the two pushing surfaces 28*f*, the pushing surfaces 28 attempt to move upward. However, when the pushing surfaces 28*s* are pushed simultaneously with the pushing surfaces 28*f*, the first plug connector 12*f* is not caused to sway. Similarly, in a case where the first plug connector 12*f* attempts to sway around a line L2 passing through the pushing surface 28*f* and the pushing surface 28*s* which are located on the right side in FIG. 1, the attempt to sway can be prevented by a downward force applied to the pushing surface 28*f* and the pushing surface 28*s* which are located on the left side in FIG. 1. This can eliminate the necessity for the operator to repeatedly adjust the position of the plug connectors 12*f* and 12*s* during operation to insert the plug connectors 12*f* and 12*s* into the receptacle connectors 14*f* and 14*s*, and can thus improve workability of mating the connectors.

Meanwhile, for securing four push points, it is also conceivable that the first plug connector 12*f* and the second plug connector 12*s* are initially formed as one integral connector rather than being formed as mechanically couplable connectors. That is, it may be considered to prepare a single plug connector 12 including a single main body 20 in which eight wire connection holes 26 are defined, four push members 22 protruded from the single main body 20, and a single retainer lug 24 fixed to the single main body 20. Even with this configuration of the plug connector 12, the four pushing surfaces 28 can be secured for pushing the plug connector 12, to thereby prevent inclination thereof.

However, in this case, workability in assembling the temperature sensor or the rotating electric machine will be deteriorated. Specifically, the first and second temperature sensors are respectively connected to the first and second plug connectors 12*f* and 12*s*, and respectively attached, in the connected state, to the first and second rotating electric machines. Further, the first and second rotating electric machines incorporating the first and second temperature sensors are installed in the vehicle. In a case where the first plug connector 12*f* and the second plug connector 12*s* are integrated into one plug connector 12, the first temperature sensor has been mechanically coupled to the second temperature sensor via the plug connector 12 and the electric wires 18. In this case, an action of moving one of the first and second temperature sensors is transferred to the other of the first and second temperature sensors, which often causes unintentional behavior of the temperature sensors. As a result, the operator is not able to move the temperature sensors and the rotating electric machines as desired, resulting in deteriorated workability in installation.

With this in mind, in this example, the first plug connector 12*f* and the second plug connector 12*s* are formed as completely separated independent components, and mechanically coupled to each other only when the connectors are mated. In this way, it becomes possible to improve workability in mating the connectors while improving workability in installing the temperature sensors and the rotating electric machines.

Figure 5:
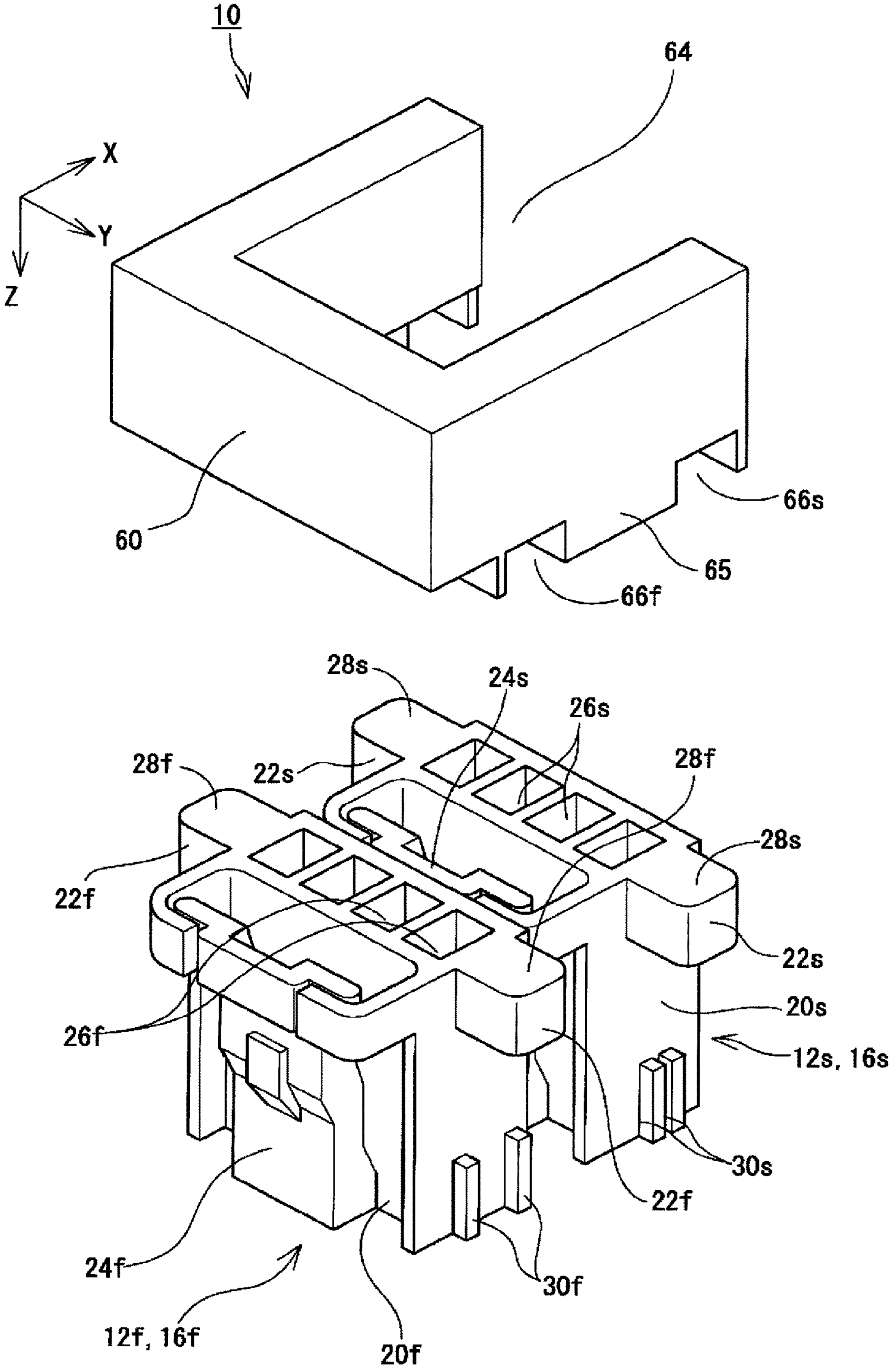
FIG. 5 is a perspective view of another connector set.
Figure 6:
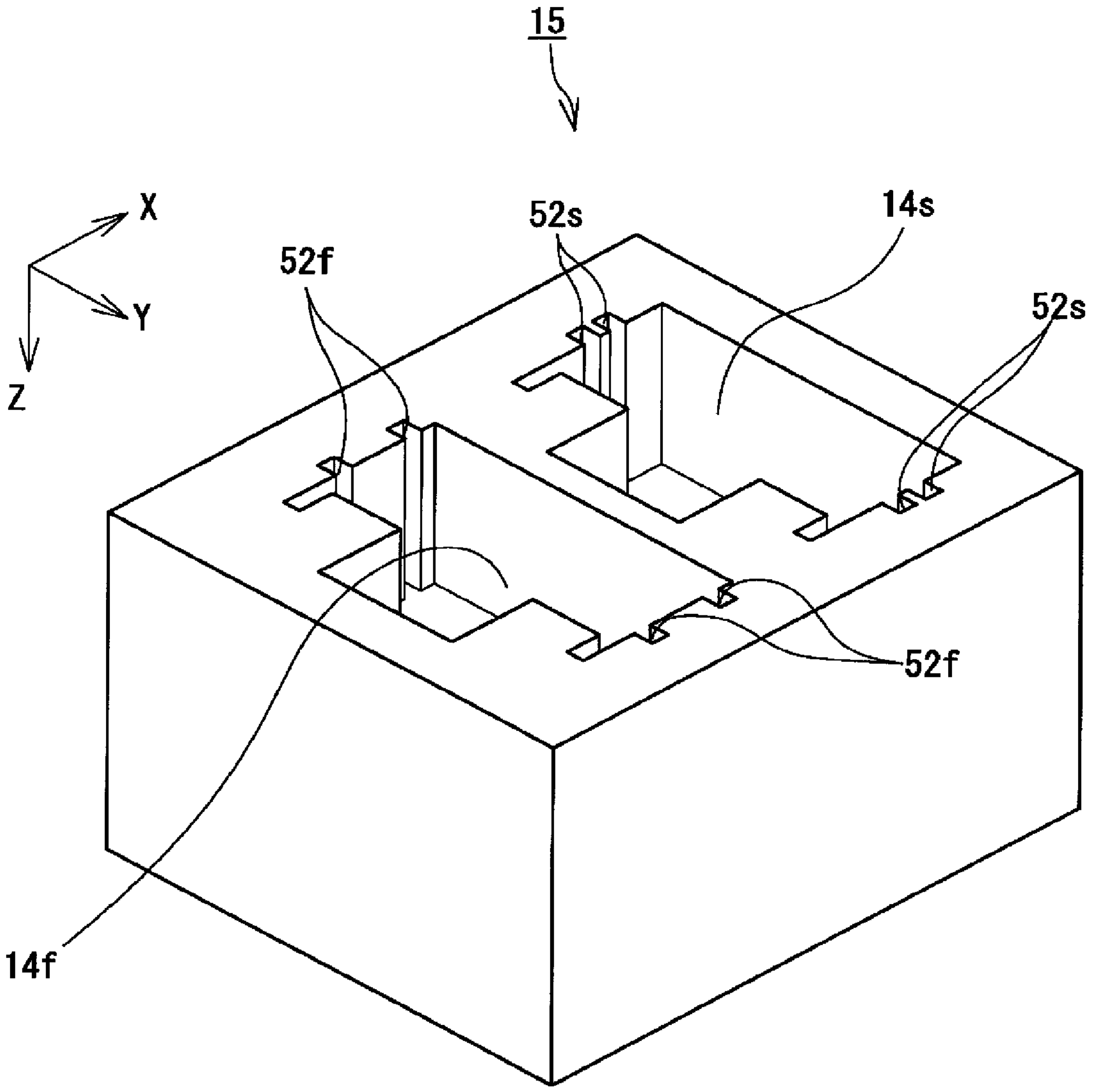
FIG. 6 is a perspective view of another terminal base.
Figure 7:
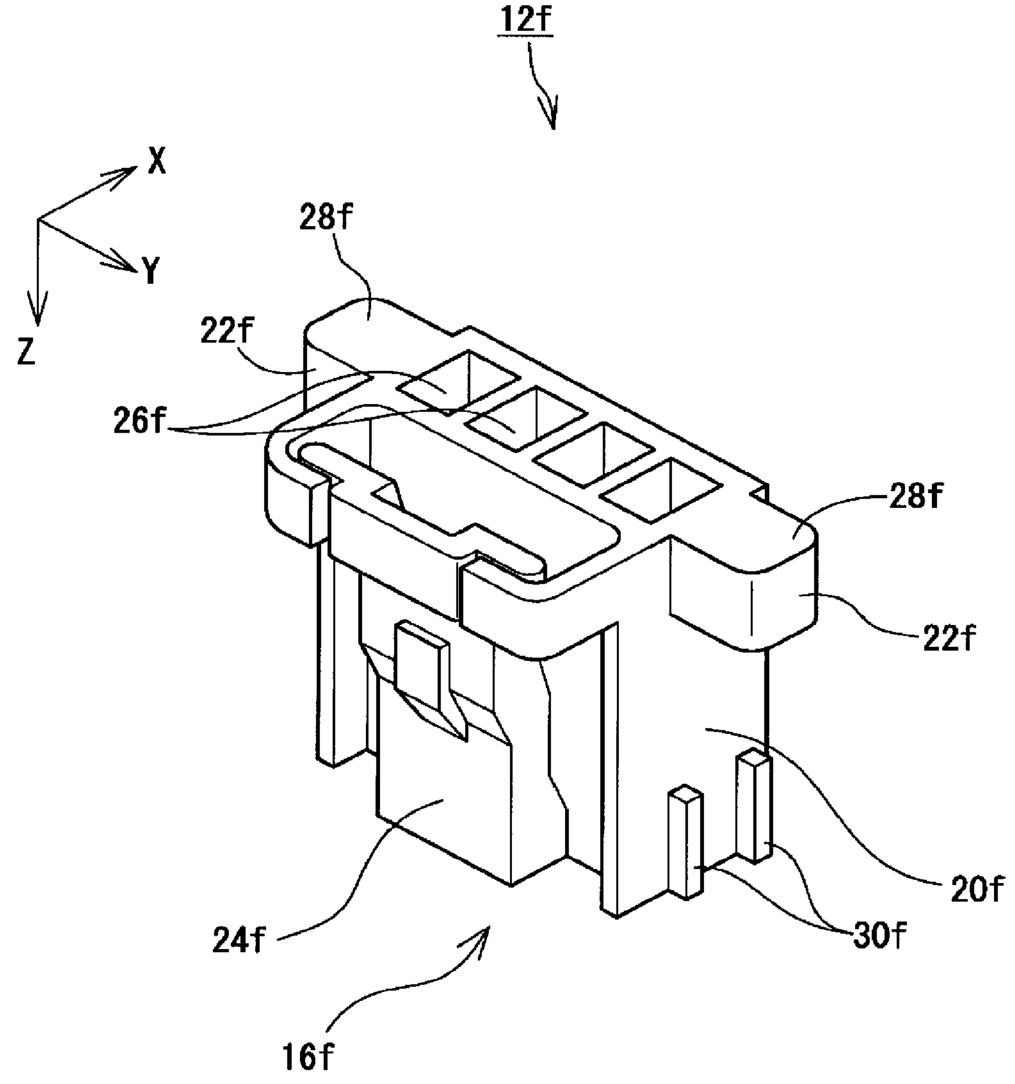
FIG. 7 is a perspective view of a first plug connector in the connector set shown in FIG. 5.
Figure 8:
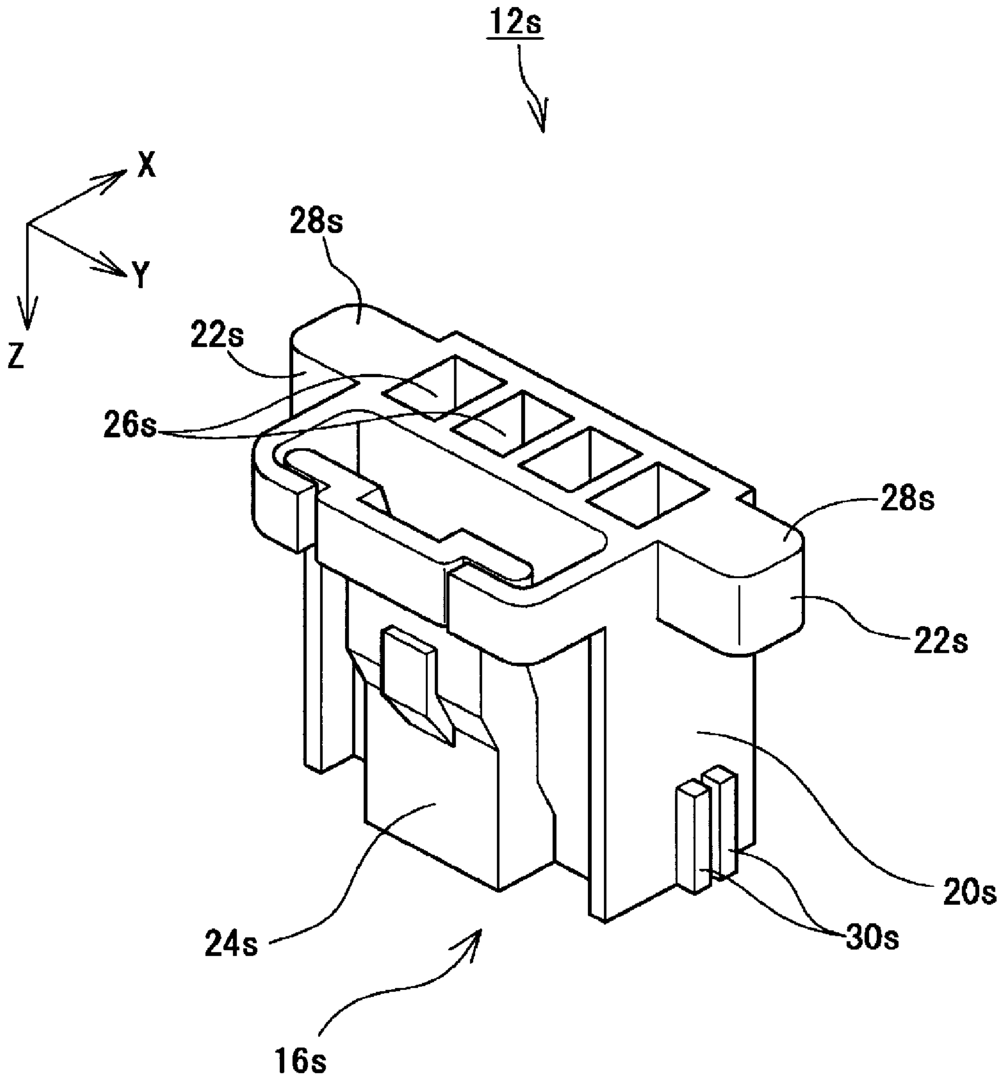
FIG. 8 is a perspective view of a second plug connector in the connector set shown in FIG. 5.
Figure 9:
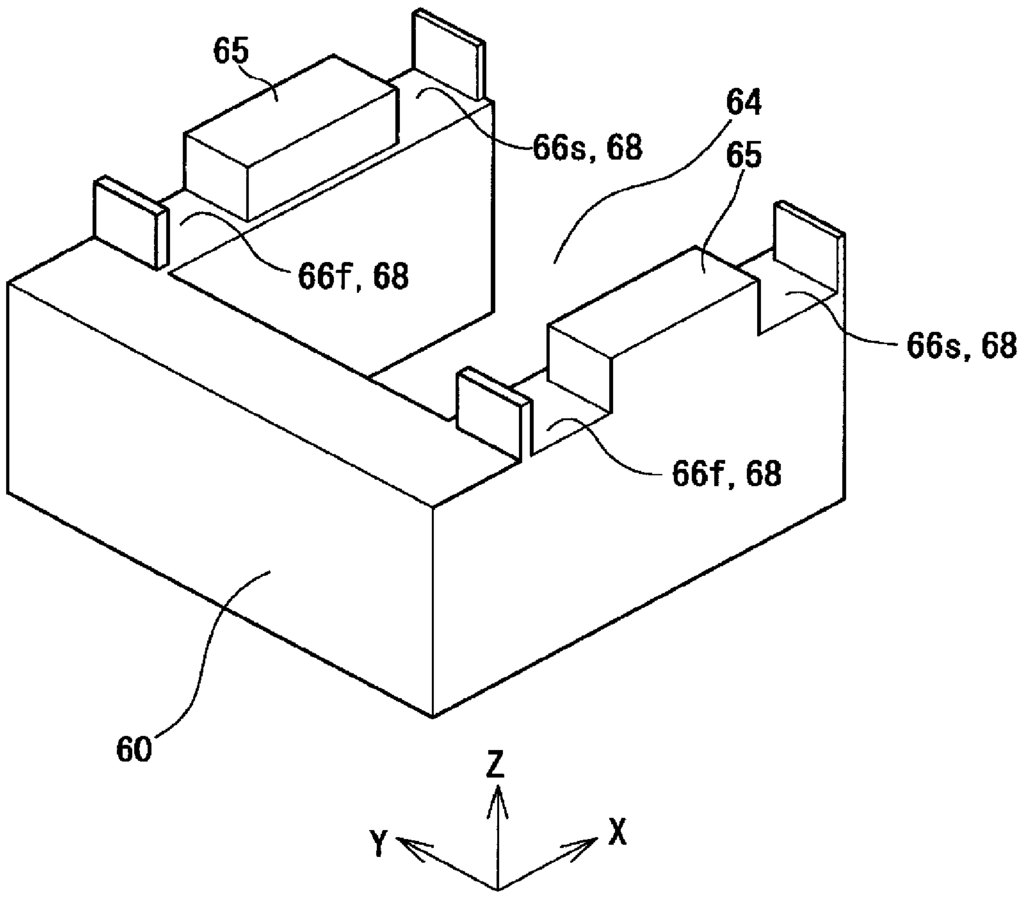
FIG. 9 is a perspective view of a jig which is flipped upside down from a state shown in FIG. 5.

Next, another connector set 10 and another connector mating method are explained with reference to FIGS. 5 to 9. FIG. 5 shows a perspective view of the connector set 10, and FIG. 6 shows a perspective view of a terminal base 15. FIG. 7 shows a perspective view of a first plug connector 12*f*, and FIG. 8 shows a perspective view of a second plug connector 12*s*. In addition, FIG. 9 shows a perspective view of a jig 60 which is flipped upside down from a state shown in FIG. 5.

The connector set 10 shown in FIG. 5 includes the jig 60 in addition to the first plug connector 12*f* and the second plug connector 12*s*. The jig 60 is designed to bind a relative positional relationship between the first plug connector 12*f* and the second plug connector 12, which will be described further below.

The first plug connector 12*f* includes the main body 20*f*, the push member 22*f*, the retainer lug 24*f*, and the guide ribs 30*f*. Configurations of the main body 20*f*, the push member 22*f*, the retainer lug 24, and the guide ribs 30*f* are almost identical to those of the first plug connector 12*f* shown in FIGS. 1 and 3, and the descriptions related to the configurations are not repeated. It should be noted that the first plug connector 12*f* in this example does not include the coupler member 32, in contrast to the first plug connector 12*f* shown in FIGS. 1 and 3.

The second plug connector 12*s* has a configuration almost identical to the first plug connector 12*f*, and includes the main body 20*s*, the push member 22*s*, the retainer lug 24*s*, and the guide ribs 30*s*. However, the guide ribs 30*s* are arranged at positions shifted toward the center in the second direction relative to the guide ribs 30*f*. That is, a positional relationship between the guide ribs 30*s* and the main body 20*s* is different from a positional relationship between the guide ribs 30*f* and the main body 20*f*.

The terminal base 15 shown in FIG. 6 has a first receptacle connector 14*f* configured to receive the first plug connector 12*f* and a second receptacle connector 14*s* configured to receive the second plug connector 12*s*. The first receptacle connector 14*f* and the second receptacle connector 14*s* have a very similar formation, yet have a difference in position between guide grooves 52*f* and guide grooves 52*s* that are configured to receive the guide ribs 30*f* and 30*s*, respectively.

For this reason, when it is attempted to insert the first plug connector 12*f* into the second receptacle connector 14*s*, the guide ribs 30*f* interfere with a part of the second receptacle connector 14*s*. Similarly, when it is attempted to insert the second plug connector 12*s* into the first receptacle connector 14*f*, the guide ribs 30*s* interfere with a part of the first receptacle connector 14*f*. In other words, an insertion error where the plug connector 12*f* or 12*s* is inserted into an unassociated one of the receptacle connectors 14*s* and 14*f* can be reliably prevented by varying the positional relationship between the guide ribs 30*f* and the main body 20*f* from the positional relationship between the guide ribs 30*s* and the main body 20*s*.

When inserting the plug connectors 12*f* and 12*s* into the receptacle connectors 14*f* and 14*s*, the operator binds a relative positional relationship between the plug connectors 12*f* and 12*s* by the jig 60. The jig 60 is a substantially U-letter shaped member which is open at one of its second direction ends when viewed from above. In other words, the jig 60 is open to the outside at the one of the second direction ends and has a cutout space 64 penetrating through the jig 60 along the vertical direction. The cutout space 64 is defined to allow the electric wires 18*f* and 18*s* to pass therethrough.

In addition, a pair of binding walls 65 are downwardly protruded from a lower end surface of the jig 60. The pair of binding walls 65 are spaced from each other along the first direction, and a spacing distance in the first direction between the two binding walls 65 is substantially equal to or slightly greater than a dimension, in the first direction, of the main body 20. In addition, each of the binding walls 65 has two binding grooves 66*f* and 66*s* which are spaced from each other in the second direction and configured to receive the push members 22*f* and 22*s*, respectively. Accordingly, in the entire jig 60, a total of four binding grooves 66*f* and 66*s* are formed.

The binding grooves 66*f* and 66*s* respectively receive partial regions (i.e., the push members 22*f* and 22*s*) in the two plug connectors 12*f* and 12*s* being adjacently aligned along the second direction, to thereby function as a binding member for binding the relative positional relationship between the two plug connectors 12*f* and 12*s*. Dimensions, in the second direction, of the binding grooves 66*f* and 66*s* are defined to be approximately equal to or slightly smaller than dimensions in the second direction of the push members 22*f* and 22*s*. In this connection, as shown in FIGS. 5 and 9, walls of the binding grooves 66*f* and 66*s* located at second direction ends of each of the binding walls 65 are relatively thin and bendable like a leaf spring. When the push members 22*f* and 22*s* are respectively press fitted into the binding grooves 66*f* and 66*s*, the push members 22*f* and 22*s*, and thus the plug connectors 12*f* and 12*s*, are retained due to a frictional force or an elastic restoring force of the leaf spring by the jig 60. Further, bottom surfaces of the binding grooves 66 function as contact surfaces 68 for pushing the pushing surfaces 28.

In operation to mate the connectors, the operator positions the main bodies 20*f* and 20*s* between the pair of the binding walls 65 and then forces the push members 22*f* and 22*s* to enter the binding grooves 66*f* and 66*s*. As a result, the pair of binding walls 65 inhibit movement of the plug connectors 12*f* and 12*s* in the first direction while the binding grooves 66*f* and 66*s* inhibit movement of the plug connectors 12*f* and 12*s* in the second direction. In addition, the plug connectors 12*f* and 12*s* are retained within the jig 60 by the frictional force occurring between the binding groove 66*f*, 66*s* and the push member 22*f*, 22*s* or the elastic restoring force of the leaf spring, without escaping downward from the jig 60. As a result, the two plug connectors 12*f* and 12*s* are bound to a positional relationship in which the plug connectors 12*f* and 12*s* are adjacent to each other in the second direction.

In this state, the operator places the plug connectors 12*f* and 12*s* in position relative to the associated receptacle connectors 14*f* and 14*s* and pushes the jig 60 from above. This causes the plug connectors 12*f* and 12*s* to respectively enter the associated receptacle connectors 14*f* and 14*s*. In this operation, the four pushing surfaces 28 are simultaneously pushed by the contact surfaces 68 in the jig 60. Here, a top surface of the jig 60 has a sufficient space to be held by a hand or fingers, which allows the operator to planarly push and press the jig 60. It is therefore possible to downwardly push the plug connectors 12*f* and 12*s* while preventing the jig 60, and thus the plug connectors 12*f* and 12*s*, from getting inclined. As a result, there is no necessity to constantly adjust the position of the plug connectors 12*f* and 12*s* during operation to insert the plug connectors 12*f* and 12*s* into the receptacle connectors 14*f* and 14*s*, and workability in operation to mate the connectors can be accordingly improved.

It should be noted that the four binding grooves 66*f* and 66*s*, all of which have the same shape, might invite a fitting error which is caused by incorrectly fitting the push member 22*s* into the binding groove 66*f* being essentially intended to receive the push member 22*f*. However, if an attempt to insert the plug connectors 12*f* and 12*s* into the receptacle connectors 14*f* and 14*s* is made in such an erroneously fitted state, the guide ribs 30*f* and 30*s* will interfere with a part of the receptacle connectors 14*f* and 14*s*, and accordingly prevent the attempt to insert the plug connectors 12*f* and 12*s* from being successfully accomplished. In this way, an insertion error of the plug connectors 12*f* and 12*s* can be reliably prevented according to this example.

When the two plug connectors 12*f* and 12*s* enter the receptacle connectors 14*f* and 14*s* to the deepest position, the retainer lug 24 is locally engaged with the receptacle connectors 14*f* and 14*s*. After the engagement is established, the operator pulls up the jig 60 to remove the jig 60 from the plug connectors 12*f* and 12*s*. Here, because the jig 60 has a holding force which is sufficiently smaller than an engagement force exerted by the retainer lug 24, it is possible to remove the jig 60 from the plug connectors 12*f* and 14*s* only by lifting the jig 60. When the jig 60 is removed in this way, the connector mating work is complete.

As can be clearly understood from the above explanation, the relative positional relationship between the two plug connectors 12*f* and 12*s* is bound by the jig 60, and the thus-bound plug connectors 12*f* and 12*s* can be planarly pushed and pressed from the top of the jig 60. As a result, the plug connectors 12*f* and 12*s* can be effectively prevented from getting inclined, which makes the work to insert the plug connectors 12*f* and 12*s* into the receptacle connectors 14*f* and 14*s* quick and easy.

The above-described configuration is presented by way of illustration, and may be modified in various ways other than features that each of the plug connectors 12*f* and 12*s* has the pair of push members 22*f*, 22*s* protruding along the first direction from both sides of the main body 20*f*, 20*s*, and that the two plug connectors 12*f* and 12*s* are mechanically coupled to each other or bound by the jig 60 in a position where the push members 22*f* are displaced in the second direction from the push members 22*s*, and are inserted into the associated receptacle connectors 14*f* and 14*s* while being mechanically coupled to each other or bound by the jig 60.

For example, the shapes and other features of the plug connectors 12*f* and 12*s* may be changed as appropriate. For example, the second plug connector 12*s*, which does not include the retainer lug 24 in the example shown in FIG. 1, may have a retainer lug 24 on a surface located opposite the coupling member 38. Further, in the example of FIG. 1, the way of coupling the two plug connectors 12*f* and 12*s* may be changed as appropriate. For example, the two plug connectors 12*f* and 12*s* may be coupled to each other by a magnetic force or a hook-and-loop fastener, by press fitting, or by other component. Also in the example shown in FIG. 5, the shapes of the plug connectors 12*f* and 12*s* and the jig 60 may be changed as appropriate.

In the above description, the connector set 10 includes the two plug connectors 12*f* and 12*s*, but may be configured to include three or more plug connectors 12. For example, the connector set 10 may include three plug connectors which can be mechanically coupled to each other. In addition, the number of electric wires 18*f* or 18*s* to be connected to each of the plug connectors 12*f* or 12*s*, and arrangement, types, and other features of the electric wires 18*f* and 18*s*, may be changed as appropriate. Therefore, the electric wires 18*f*, 18*s* may be an electric wire connected to any electronic device other than the temperature sensor.

REFERENCE SIGNS LIST

10 connector set; 12*f* first plug connector; 12*s* second plug connector; 14*f* first receptacle connector; 14*s* second receptacle connector; 15 terminal base; 16*f*, 16*s* housing; 18*f*, 18*s* electric wire; 20*f*, 20*s* main body; 22*f*, 22*s* push member; 24*f*, 24*s* retainer lug; 26*f*, 26*s* wire connection hole; 28*f*, 28*s* pushing surface; 30*f*, 30*s* guide rib; 32 coupler member; 34 coupling loop; 36 slide claw; 38 coupling member; 40 rail member; 42 coupling lug; 42*a* hitching portion; 44 slide rail; 45 stopper surface; 52*f*, 52*s* guide groove; 60 jig; 64 cutout space; 65 binding wall; 66*f*, 66*s* binding groove; 68 contact surface.

The invention claimed is:

1. A connector mating method for inserting a first plug connector into a first receptacle connector and a second plug connector into a second receptacle connector, to mate the first and second plug connectors to the first and second receptacle connectors, wherein each of the first plug connector and the second plug connector comprises a main body configured to retain a plurality of electric wires, and a pair of push members protruding from both sides of the main body along a first direction, wherein the first plug connector and the second plug connector are mechanically coupled to each other or bound by a jig to a relative positional relationship therebetween in a position where the pair of push members in the first plug connector are displaced from the pair of push members in the second plug connector along a second direction orthogonal to the first direction, and inserted into the first receptacle connector and the second receptacle connector while being mechanically coupled to each other or being bound to the relative positional relationship by the jig, wherein the main body comprises a plurality of wire connection holes in which the plurality of electric wires are respectively inserted, the plurality of wire connection holes and the pair of push members being aligned with each other along the first direction, wherein the first receptacle connector and the second receptacle connector are recesses that are completely separated from each other, with a partition wall interposed between the first receptacle connector and the second receptacle connector, and wherein, upon the first plug connector and the second plug connector being mechanically coupled to each other or bound by the jig, a recess for receiving the partition wall is formed between the first plug connector and the second plug connector.

2. The connector mating method according to claim 1, wherein the first plug connector and the second plug connector are mechanically coupled to each other or bound to the relative positional relationship by the jig in a position where the first and second plug connectors are adjacent in the second direction.

3. The connector mating method according to claim 1, wherein each of the first and second plug connectors further comprises a guide rib extending along an insertion direction, the guide rib being configured to be received in a guide groove defined in an associated one of the first and second receptacle connectors, wherein a relative position between the guide rib in the first plug connector and the main body is varied from a relative position between the guide rib in the second plug connector and the main body, and wherein when one of the plug connectors tries to enter an unassociated one of the first and second receptacle connectors, the guide rib interferes with a part of the unassociated one of the first and second receptacle connectors to thereby block further entry of the one of the plug connectors.

4. A connector set, comprising:

a first plug connector configured to be inserted into a first receptacle connector; and a second plug connector configured to be inserted into a second receptacle connector, wherein each of the first plug connector and the second plug connector comprises a main body configured to retain a plurality of electric wires, and a pair of push members protruding from both sides of the main body along a first direction, wherein the first plug connector and the second plug connector are mechanically couplable to each other in a position where the pair of push members in the first plug connector are displaced from the pair of push members in the second plug connector along a second direction orthogonal to the first direction, wherein the main body comprises a plurality of wire connection holes in which the plurality of electric wires are respectively inserted, the plurality of wire connection holes and the pair of push members being aligned with each other along the first direction, wherein the first receptacle connector and the second receptacle connector are recesses that are completely separated from each other, with a partition wall interposed between the first receptacle connector and the second receptacle connector, and wherein, upon the first plug connector and the second plug connector being mechanically coupled to each other, a recess for receiving the partition wall is formed between the first plug connector and the second plug connector.

5. A connector set, comprising:

a first plug connector configured to be inserted into a first receptacle connector;

a second plug connector configured to be inserted into a second receptacle connector; and a jig, wherein each of the first plug connector and the second plug connector comprises a main body configured to retain a plurality of electric wires, and a pair of push members protruding from both sides of the main body along a first direction, wherein the jig comprises a binding member configured to partially receive both the first plug connector and the second plug connector for binding a relative positional relationship between the first plug connector and the second plug connector in a position where the pair of push members in the first plug connector are displaced from the pair of push members in the second plug connector along a second direction orthogonal to the first direction, wherein the binding member includes a pair of binding grooves that receive two of the push members and a single binding wall defining a respective edge of the pair of binding grooves in the second direction, wherein the first receptacle connector and the second receptacle connector are recesses that are completely separated from each other, with a partition wall interposed between the first receptacle connector and the second receptacle connector, and wherein, upon the first plug connector and the second plug connector being bound by the jig, a recess for receiving the partition wall is formed between the first plug connector and the second plug connector.

* * * * *